United States Patent [19]

Baumann

[11] 3,988,857
[45] Nov. 2, 1976

[54] ACCESSORY UNIT FOR HYDROPONICS RECEPTACLES

[75] Inventor: Gerhard Baumann, Bern, Switzerland

[73] Assignee: Interhydro AG, Bern, Switzerland

[22] Filed: Aug. 14, 1974

[21] Appl. No.: 497,477

[30] Foreign Application Priority Data
Aug. 15, 1973 Switzerland.................. 11731/73

[52] U.S. Cl.................................. 47/1.2; 73/294; 73/322; 116/118 R; 141/95
[51] Int. Cl.².................... A01G 31/02; G01F 23/06
[58] Field of Search....................... 47/1.2, 38, 38.1; 73/294, 306, 322; 141/95; 116/118 R; 220/366, 356, 307

[56] References Cited
UNITED STATES PATENTS

| | | | |
|---|---|---|---|
| 595,320 | 12/1897 | Long............................ | 116/118 R |
| 631,099 | 8/1899 | Treibel et al. ................. | 73/294 |
| 820,168 | 5/1906 | Andrews........................ | 47/38 |
| 962,674 | 6/1910 | Sendall......................... | 116/118 R |
| 1,160,465 | 11/1915 | Thomas......................... | 116/118 R |
| 1,192,693 | 7/1916 | Schultz......................... | 73/322 |
| 1,243,587 | 10/1917 | Burkett......................... | 73/294 |
| 1,646,317 | 10/1927 | Rein............................. | 73/322 |
| 1,953,765 | 4/1934 | McCluney...................... | 220/366 X |
| 2,349,800 | 5/1944 | Lee.............................. | 220/356 X |
| 2,868,016 | 1/1959 | Steed............................ | 73/322 |
| 3,483,656 | 12/1969 | Baumann....................... | 47/1.2 |
| 3,630,083 | 12/1971 | Gorans.......................... | 73/294 |
| 3,659,458 | 5/1972 | Bice et al...................... | 73/306 |
| 3,739,524 | 6/1973 | Rose............................. | 47/38.1 |
| 3,805,445 | 4/1974 | Baumann....................... | 47/1.2 |

FOREIGN PATENTS OR APPLICATIONS

| | | | |
|---|---|---|---|
| 2,303,069 | 7/1974 | Germany....................... | 47/1.2 |
| 397,318 | 2/1966 | Switzerland.................... | 47/1.2 |

Primary Examiner—Edgar S. Burr
Assistant Examiner—Steven A. Bratlie
Attorney, Agent, or Firm—Imirie, Smiley & Linn

[57] ABSTRACT

The invention concerns an accessory unit for plant receptacles for hydroponics, this accessory unit forming the water-level gauge-channel and the pouring-in-and emptying-channel, both of the channels being placed close to each other, rigidly connected together but separated along their whole height by a partition wall.

2 Claims, 3 Drawing Figures

U.S. Patent    Nov. 2, 1976    3,988,857
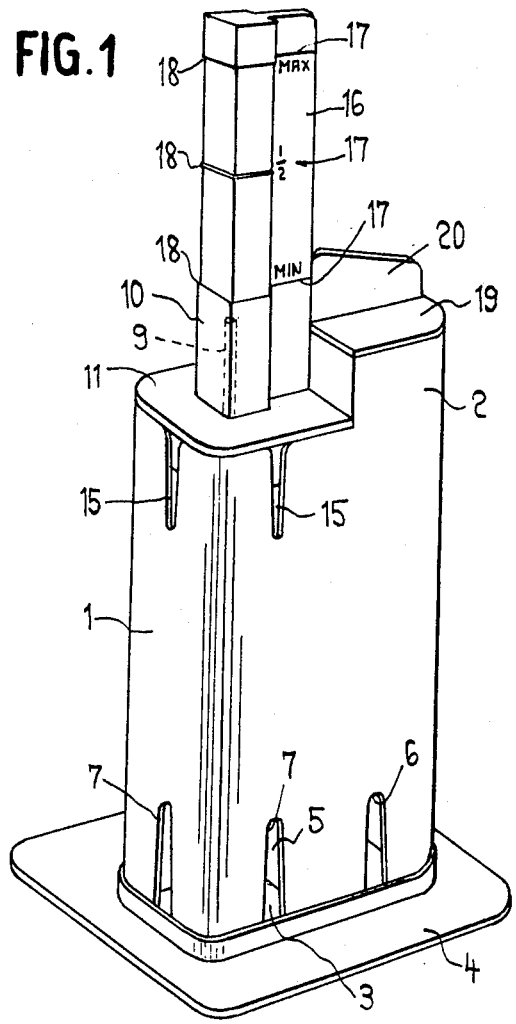
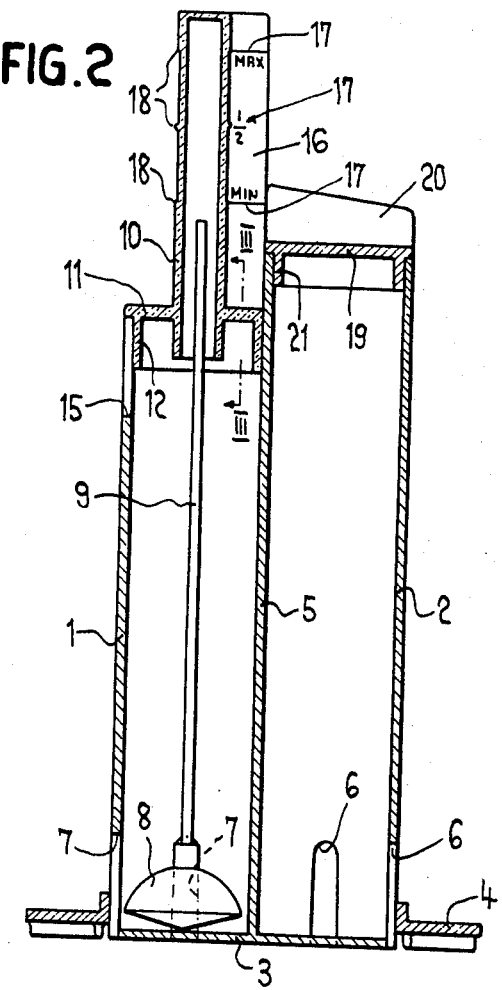
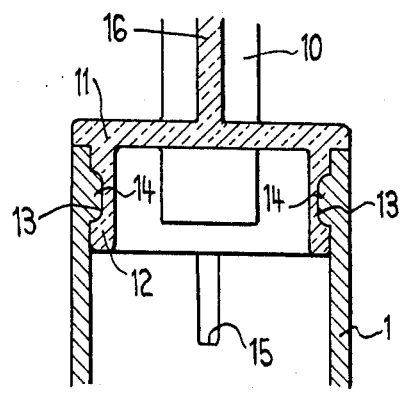

ACCESSORY UNIT FOR HYDROPONICS RECEPTACLES

BACKGROUND OF THE INVENTION

The invention concerns an accessory unit for a plant receptacle having a water-level gauge-channel and a pouring-in-and emptying-channel, for hydroponics.

In prior known plant receptacles for hydroponics, exemplified by U.S. Pat. No. 3,483,656, the water-level gauge-channel and the pouring-in- and emptying-channel are distinct units, spaced from each other more or less and placed in the substrate of the plant receptacle. In another known embodiment, the pouring-in- and emptying-channel is rigidly mounted on the wall of the plant receptacle.

However, these known embodiments are generally suitable for big plant receptacles in view of the control of the water-level during pouring-in with a nutrient solution in the pouring-in-channel, even though they have some disadvantages in manufacture and for the filling with substrate. It is often unpleasant for the user to have to search for the water-level gauge and the pouring-in-channel in two different places, especially if the channels are partially covered with foliage of plants.

SUMMARY OF THE INVENTION

It is the aim of the present invention to remedy these inconveniences. The accessory unit for plant receptacles according to the invention is characterized in that it forms the water-level gauge-channel and the pouring-in- and emptying-channel rigidly connected together, both of the channels being placed close to each other and completely separated along their whole height by a partition wall. Both channels can be made in one piece, for example. In this way, only one element is to be placed in the plant receptacle before filling in the substrate and, further, the manufacture of such an element is advantageously facilitated. Furthemore, the user finds both channels in the same place within the plant receptacle for ease in use.

Other features and advantages will appear in the following description taken in connection with the appended drawings.

BRIEF DESCRIPTION OF THE DRAWINGS

FIG. 1 is a perspective view of an accessory unit according to the present invention;

FIG. 2 is a vertical sectional view of the accessory unit of FIG. 1; and

FIG. 3 is a sectional enlarged view along the line III—III of FIG. 2.

DESCRIPTION OF THE PREFERRED EMBODIMENT

Referring now to FIG. 1, the water-level gauge-channel 1 is disposed close to the pouring-in- and emptying-channel 2 and is rigidly connected therewith. Both channels 1 and 2 may be made of synthetic material formed in one piece. They have a common bottom wall 3 and, in the region of bottom wall 3, a rigid or movable outer flange 4 is connected to the channels 1 and 2 so that the substrate laying on the flange impedes an undesired lifting and removal of the accessory unit. As shown in FIG. 2, both of the channels 1 and 2 are separated along their whole height by a partition wall 5. The partition wall 5 has no opening to allow the nutrient solution poured into channel 2, to pass directly into channel 1 since this could falsify the water-level indication. The nutrient solution must come out through slits 6 and will be distributed through the plant receptacle. Then, from the receptacle, the solution will enter through slits 7 into the channel 1. This operation allows a particularly accurate level indication in small plant receptacles. A conventional float 8 is placed in the channel 1 and carries an indicator bar 9 which protrudes upwardly into a transparent sight tube 10. This sight tube 10 is rigidly mounted on a cover 11 or it may be made in one piece with the cover 11. The cover 11 has a collar 12 with indents 13 on at least two opposite sides, which indents are engaged with knobs 14 of the channel 1 when the cover 11 is put on. These indents 13 with the knobs 14 impede unintentional or undesired lifting of the cover 11 as by a child. The conventional vent openings 15 give some resilience to the upper part of the walls of channel 1, thereby facilitating putting on of the cover 11 without allowing unrestrained lifting of the same.

A scale support 16, in the shape of a strip is fixed on the sight tube 10 and on the cover 11 respectively. This scale support can be made in one piece with the sight tube 10 and the cover 11. The scale support has marks 17 with the inscription "Min", "½", "Max". If desired there may be more marks 17 on the scale support. At the height corresponding to each mark 17, the sight tube 10 has marks 18 without inscription, formed for example by a rib running round the sight tube 10. The scale support 16 has marks 17 with inscriptions on both of its flat sides. These marks could be made directly on the sight tube 10; in which case, the scale support 16 may be omitted. The legibility may be improved if the support 16 and/or the sight tube are/is colored.

The upper end of the pouring-in- and emptying-channel 2 protrudes above the water-level gauge-channel 2 and has a cover 19 with a collar 21 and with a flat vertical grip 20. It is easier to lift the cover 19 than the cover 11. In U.S. Pat. No. 3,805,445 the problem is mentioned that, after removal of the cover 19, substrate can be inadvertantly thrown, by a child for example, into the channel 2. The disadvantage resulting from this may be avoided if an upwards removable insert, for instance as disclosed in the above U.S. patent is placed in the channel 2. A similar insert may be provided in the channel 1 although removal of the cover 11 is more difficult.

The outer flange 4 might be omitted too. The accessory unit may be used in big plant receptacles as well as in small ones.

What I claim is:

1. An accessory unit for a hydroponics plant receptacle comprising a flat support element to be placed on the bottom of the plant receptacle for supporting said accessory unit; a duct attached to and extending upwardly from said support element, said duct having vertical side walls extending completely thereabout to form a hollow, tubular member, a water-tight partition wall connected to said vertical side walls within said duct and completely subdividing said duct vertically into a water-level indicator channel and a separate pouring-in and emptying channel, and a bottom wall for at least said indicator channel; said partition wall and said duct including said bottom wall comprising an integral, unitary piece; and indicator assembly including an indicator rod supported upon a float, said float disposed completely within said water-level indicator channel; a cover member for said water-level indicator channel, said cover member including an upwardly extending scale carrier having a scale, said indicator rod being disposed for vertical movement relative to said scale carrier and cooperating with said scale to indicate the water level therein over the entire height of said indicator channel; and openings in said vertical side walls of said duct adjacent said support element establishing communication of each of said channels exteriorly of said duct, said partition wall precluding direct communication of said channels with each other within said duct, whereby said indicator assembly provides an accurate indication of water level in the receptacle over the entire height thereof independent of the water level within said pouring-in and emptying channel.

2. An accessory unit for a hydroponics plant receptacle, comprising: a flat support element to be placed on the bottom of the plant receptacle for supporting said accessory unit; a duct attached to and extending upwardly from said support element, said duct having vertical side walls extending completely thereabout to form a hollow, tubular member, a water-tight partition wall disposed within said duct and completely subdividing said duct vertically into a water-level indicator channel and a separate pouring-in and emptying channel, and a bottom wall common to both said channels; said vertical side walls, said partition wall and said bottom wall comprising an integral, unitary piece; said support element having a horizontal flange extending around said duct; a float disposed within said water-level indicator channel; openings in said vertical side walls of said duct adjacent said support element establishing communication of each of said channels exteriorly of said duct, said partition wall precluding direct communication of said channels with each other within said duct; a cover member for said water-level indicator channel, said cover member including an upwardly extending scale carrier having a scale defining a plurality of horizontal ribs; said float including an indicator disposed for vertical movement relative to said scale carrier and cooperating with said ribs of said scale to indicate water level within said water-level indicator channel; a removable cover for said pouring-in and emptying channel, said removable cover having a vertical, flat handle; and the upper end of said pouring-in and emptying channel terminating above the upper end of said water-level indicator channel.

* * * * *